Oct. 10, 1967  P. BRADFORD  3,346,393
METHOD AND APPARATUS FOR SEPARATING FAT AND
SOLIDS FROM MEAT SCRAPS
Filed Sept. 12, 1960  3 Sheets-Sheet 3

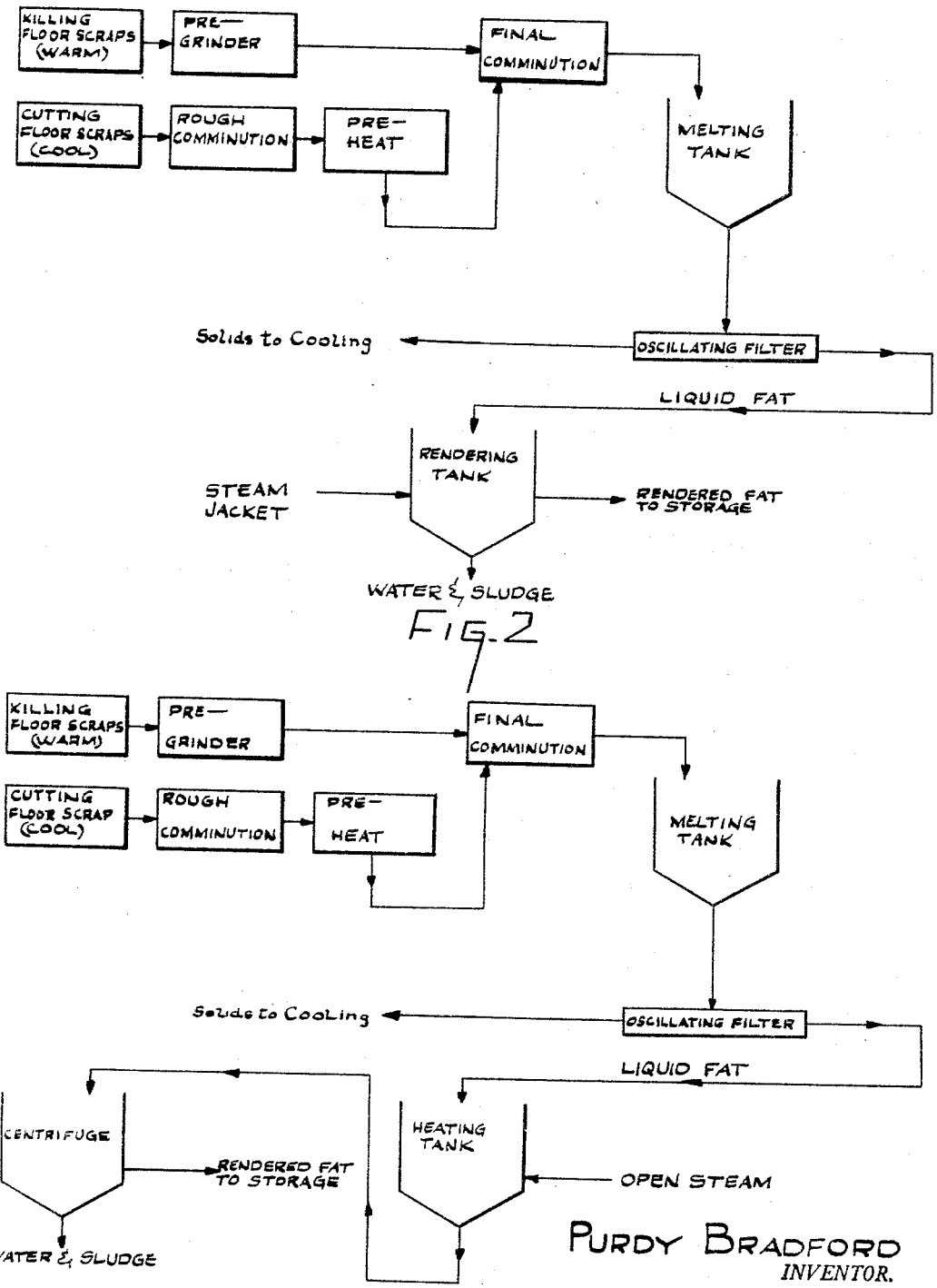

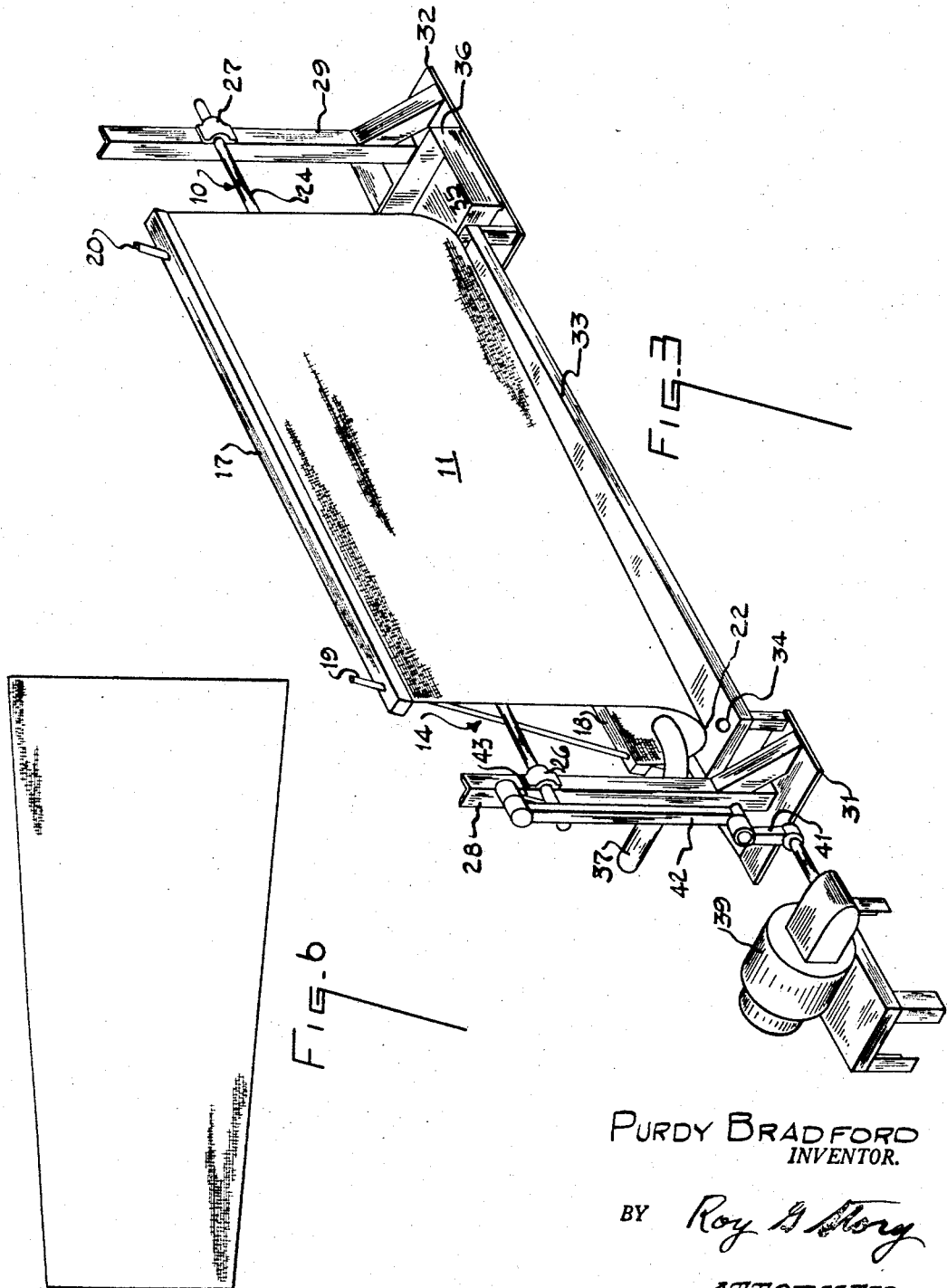

PURDY BRADFORD
INVENTOR.

BY Roy G. Story
ATTORNEY

United States Patent Office 3,346,393
Patented Oct. 10, 1967

3,346,393
METHOD AND APPARATUS FOR SEPARATING FAT AND SOLIDS FROM MEAT SCRAPS
Purdy Bradford, Palos Park, Ill., assignor to Swift & Company, Chicago, Ill., a corporation of Illinois
Filed Sept. 12, 1960, Ser. No. 55,406
3 Claims. (Cl. 99—108)

The present invention relates to the rendering of animal scraps and more particularly to an improved method and apparatus for the rendering of fat from packing house scraps and the separation of proteinaceous material therefrom.

In the past it has been common practice to heat fatty packing house scraps to a high temperature in the range of 200° or higher to render and recover the fatty material. In these earlier high temperatures processes little, if any, of the nonfat material, particularly any scrap protein material, has been recoverable in a useful form other than tankage suitable only for animal feeds. At the temperatures employed, any protein material present was denatured (that is, the protein was coagulated) with the result that if recoverable, its usefulness was extremely limited. Additionally, some systems rely solely upon continuous centrifuge equipment to separate the melted fat and proteinaceous material. However, due to the comparatively high level of protein present with the material enters the centrifuge, only a relatively low degree of efficiency in separation can be obtained. These systems usually separate out only about 80% of the solid material other than fat. Additional, in the continuous centrifuge type system the centrifuging equipment is very expensive, requiring a high capital investment; and is also difficult to disassemble and clean. Consequently, because of the latter fact, centrifuging equipment is subject to either lost time for cleaning or the danger of contaminated product if it is not cleaned frequently.

Accordingly, it is an object of this invention to provide a system for highly efficient separation of the protein material from fat in a rendering process.

Another object of this invention is to provide a method and apparatus for the low temperature rendering of fatty packing house waste whereby the proteinaceous material will not be denatured.

An additional object of this invention is to provide an inexpensive apparatus for increasing the efficiency of separating proteinaceous material from fat in a rendering process.

A still further object of this invention is to provide apparatus for separating most of the available protein material from fat in a rendering process which is readily disassembled and cleaned without undue loss of time.

Basically the present system comprises the comminution of fatty scrap material and melting the comminuted scrap at a temperature not over about 120° F. Filtering of the melted material through a foraminous surface follows immediately to remove substantially all of the protein matter carried with the fat. The filtering step is unique and is carried out in a novel apparatus comprising a filter sling which is kept in constant oscillatory motion to present a changing filter surface to the melted material and to agglomerate the separated solids. The recovered protein material is preferably cooled to below about 40° F. for temporary storage while the melted fat component may be further processed in either a batch or continuous manner.

The novel filter means is an important part of this system and is, fundamentally, a foraminous surface in the form of a continuously oscillatable filter cloth which is draped as a sling to provide a bight wherein the melted scrap material is received. The ends of the sling are oscillated or reciprocated to pass substantially the length of filter cloth in alternating directions through the bight, thus continuously moving the filter surface with respect to the material being filtered. The liquid fat passes through the lower portion of the bight of filter cloth while the solid protein matter is agglomerated within the bight and compacted in a roll by the movement of the sling. The agglomerated protein material is discharged from one end of the sling by gravity.

The system has been found to provide a 99% recovery of protein material, thereby exceeding the usual recovery experienced in prior systems. Furthermore, the filter apparatus is easily and quickly disassembled and cleaned. Moreover, the filter cloth sling itself exhibits a self-cleaning action due to its motion and the requirement of disassembling for cleaning purposes is held to a minimum.

Other advantages and objects of this invention will be apparent on reading the following detailed description taken in conjunction with the drawings wherein:

FIGURE 1 is a flow diagram of the continuous embodiment of this rendering system;

FIGURE 2 is a flow diagram of a batch embodiment of this rendering system;

FIGURE 3 is a perspective view of the novel filter apparatus;

FIGURE 6 is a plan view of a filter cloth for a modification of the apparatus.

Figure 4:
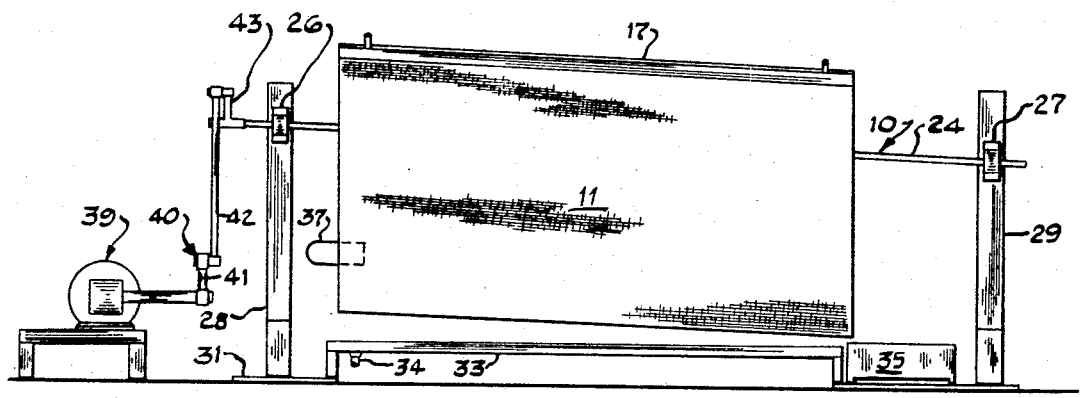
FIGURE 4 is a front elevation of the apparatus of FIGURE 3.

In practicing the method of this invention, killing and/or cutting fat scraps from the packing house floor are preferably first roughly comminuted or subdivided into relatively small pieces having a maximum dimension no greater than about one inch. The scraps are subsequently finally comminuted in a suitable device, of which several are available on the market, such as an "Emulsion Cutter" Fitz-Mill produced by the Fritzpatrick Company.

Relatively warm scrap, such as killing floor scraps which are close to live animal temperature, may advantageously be passed directly from rough to final comminution. However, cool or cold scrap material, such as cutting scrap which is obtained after carcass material is chilled, should preferably be preheated to a temperature in the range of 90°–100° F. Any suitable heated vessel may be used for the preheating step. According to the packinghouse operations the scrap material to be rendered may be either warm or cool or both and the overall rendering process may preheat none, all, or some (as shown in FIGURES 1 and 2) of the scrap material before final comminution.

The degree of comminution has a noticeable bearing upon subsequent operations to filter out protein material. It has been observed that either insufficient or excessive chopping will result in greater amounts of fat being filtered out along with the protein material. While this is not deleterious it is undesirable, and close process control should be exercised to determine the optimum amount of comminution for any given operation. The type of scrap material, temperatures employed, filter mesh, and the type of comminuting equipment utilized, are believed to influence this factor. Generally speaking the scrap should not be comminuted to an extent that the protein particles are so fine that they will clog between threads of the filter mesh. Further comment upon this matter is unnecessary as it is impractical to prescribe exact comminution limitations covering all operations which may better be determined by skilled persons following the teachings of this disclosure.

The comminuted material is next melted by heating to about 110°–120° F., preferably 118° F., in any suitable vessel such as a steam jacketed melting tank. Melting may be carried out in one or more stages according to practices already well known in the art. The heated and melted material is then filtered in the hereinafter described novel filtering apparatus, to separate substantially all of the solid protein material from the fat. Approximately 99% to 99.5% of the available protein has been found to be separated in this manner; and is thence conveyed to a cooler wherein the temperature is preferably reduced to within the range of 35° to 40° F. This protein material will not have been denatured by exposure to temperatures over 120° F. and will be available for immediate use in the production of table-ready meats, or it may be frozen for storage and future use. Concurrently the filtered liquid fat is collected from the filtering apparatus and may be further rendered if desired, either continuously or in batches.

The continuous system is shown in FIGURE 1 wherein the filtered fat is piped to a heating tank wherein live steam is injected to raise the temperature to a range of at least about 190° to 200° F. The material will then be very fluid and is pumped directly to a centrifuge wherein a sludge fraction comprising a very minor amount of protein residuum and water, is separated.

The batch system is illustrated in FIGURE 2 wherein the fat material is shown to be delivered to a steam jacketed rendering tank wherein the temperature of the liquid fat is raised to at least about 190° F. At this temperature the fatty material is sufficiently fluid to permit any proteinaceous residuum and water or other sludge material to settle to the bottom where is may be removed. The rendered fat from the batch rendering tank is periodically removed to storage.

The sludge removed from either the continuous or batch processes may be delivered to an inedible rendering tank or it can be discharged as sewage or the like.

Figure 5:
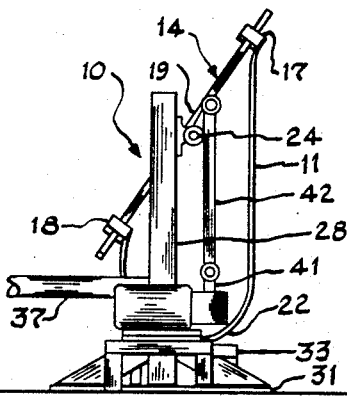
FIGURE 5 is a side elevation of the apparatus of FIGURE 3.

The filter apparatus generally 10 is shown in FIGURES 3 through 5. It comprises a substantialy rectangular filter cloth generally 11 loosely hung within an oscillatable frame generaly 14. The filter cloth may be of any suitable material; however, I prefer to use a fabric of monofilament nylon having a thread count of from about 36 x 44 to 96 x 100 per inch. The two longer sides of cloth 11 are detachably secured to a pair of rails 17, 18. In turn rails 17, 18 are removably secured to opposite ends of a pair of crossrods 19, 20. Rails 17, 18 are spaced on the crossrods 19, 20, so that the filter cloth 11 is draped as a sling or hammock between the rails to form a bight 22 or open loop throughout the length of the cloth.

The filter cloth 11 may be releasably secured to the rails 17, 18 in one of several ways obvious to a skilled mechanic. For example, the cloth could be loosely stapled in place, or held in place by a removable grommet, or secured with a plurality of snap fasteners (not shown). Similarly, the rails 17, 18 may be mounted on crossrods 19, 20 for easy disassembling such as by the use of setscrews or spacing and fastening nuts or the like (none shown).

The crossrods 19, 20 in turn are fixedly secured, such as by welding or brazing, at spaced locations to a shaft 24 which is rotatably supported between a pair of journal bearings 26, 27 fastened to the upper ends of a pair of stanchions 28, 29. The crossrods 19, 20 are preferably fixed in parallel relation so as to support the rails 17, 18 parallel and generally in the same plane with shaft 24.

Stanchions 28, 29 may be formed as illustrated from sections of angle iron secured to pedestals 31, 32 or imbedded in concrete or the like. A tray 33 is positioned between the stanchions 28, 29 beneath shaft 24 and the bight 22 of filter cloth 11 for receiving liquid filtrate dripping from the cloth. A drain pipe 34 discharges liquid from the tray 33 to a pump, not shown, for distribution to other processing equipment. Also positioned below the filter cloth 11 and adjacent stanchion 29 at the discharge end of the bight 22 and cloth 11 is a solids residue collector 35. The collector 35 comprises a housing 36 and a conveyor therein (not shown) which may be either a screw conveyor or pump or the like for removing the substantially solids residue such as the protein material in the described process.

It may be seen in FIGURE 4 that the bight 22 of filter cloth 11 slopes downwardly toward the collector 35. Thus, when the liquid melted fat is discharged from a pipe 37 onto the opposite higher end of the cloth 11, the solids residue moves by gravity across the filter cloth to the collector 35. The sloped bight 22 is preferably obtained by placing journal bearing 27 at a slightly lower level than bearing 26. Thus shaft 24 and rails 17 and 18 are inclined, and a slope is inherent in the sling of material therebetween.

However, the slope may also be obtained if shaft 24 is held level, by either converging the rails 17, 18 toward the end of the apparatus over collector 35, or by mounting only the rails at an incline to the horizontal. Also, a filter cloth as shown in FIGURE 6 shaped in the form of a truncated triangle with relatively long converging sides will inherently provide a sloped bight toward the longer parallel end. Such variations in the present structure are deemed obvious to one skilled in the art and in view of the present disclosure, are believed within the tenor of this invention.

In operation while melted fat (or other material to be filtered) is delivered to the upper end of the filter cloth 11, the assembly is rocked by oscillating the shaft 24. This is accomplished through an electric drive motor and gear reducer generally 39 which is connected to the shaft 24 by a three-bar linkage generally 40. A short bar 41 is fastened to the output shaft of the motor-gear reducer 39 and is rotatable through a full circle thereby. Bar 41 in turn is pivotally connected to a linking bar 42 which reciprocates vertically and through a slight horizontal angle at one side of stanchion 28. The upper end of linking bar 42 in turn is pivotally connected to another short bar 43, the other end of which is fixedly secured to the end of shaft 24. Thus it may be followed that the linking bar 42 pivots the short bar 43 through a given angle and rocks the filter assembly generally 10 through a corresponding angle.

Accordingly, the bight 22 in the filter cloth 11 is continuously moved with respect to the rails 17, 18 alternately from one toward the other and the curvature of the bight changes somewhat as the horizontal distance between the rails changes. However, the bight 22 will always remain above the drain tray 33. The movement of the filter cloth 11 through this bight 22 has the effect of constantly changing the active area of cloth 11 through which the material is filtered. Concurrently any solids residue collected within the bight 22 is constantly subjected to a rolling action by reason of the moving cloth 11. This action has been observed to agglomerate and compact the residue into the form of a roll which effectively clears the mesh of the filter cloth by picking up particles from the threads. Also, as the residue builds up it moves, under the force of gravity, toward the lower end of the cloth 11 and thence into the collector 35. Thus the filter cloth 11 is constantly cleared of residue and can efficiently filter the liquid material for long periods of time without the necessity of special cleaning.

As an example, skinned hog back fat from a packing house cutting floor was subdivided into approximately one-inch units in pregrinder and preheated to a temperature of 95° F. The preheated material was subsequently comminuted in a Fitz-Mill. The comminuted scrap was then melted in a steam jacketed kettle at a temperature of 120 F. and piped at a rate of about 1500 pounds per hour to the filtering apparatus. The filter comprised a rectangular filter cloth, 6 x 3 feet, draped from rails held two feet apart; and was rocked back and forth at about eight cycles per minute. 11.5 pounds of residue containing 29% fat was recovered per 100 pounds of melted material. This residue represented a recovery of 99.5% of the protein material in the original scrap. The melted fat filtrate contained only about .01% of protein residuum material and this filtrate was further processed by heating with open steam to a temperature of 200° F. while allowing a sludge to settle. The rendered fat was a satisfactory lard while the filter separated protein was used directly in table-ready meat formulas.

Obviously many modifications, variations and adaptations of the invention as hereinbefore set forth may be made without departing from the spirit and scope thereof. The filtering apparatus hereinbefore described may obviously be employed to filter numerous diverse materials. Therefore only such limitations should be imposed as are indicated in the appended claims.

I claim:
1. An improved method for continuously rendering fat from packinghouse scrap, said method comprising: comminuting fatty scrap material; heating the comminuted scrap to a flowable condition but below a temperature at which any protein material present would be denatured; thereafter continuously charging said melted fatty scrap material to a foraminous surface, said surface being arranged as a sling having a bight hung between two ends for receiving the melted material; reciprocating the ends of said sling so as to continuously change the bight thereof and to roll the material therein whereby the liquid material passes through the foraminous surface while any separated protein material is agglomerated and compacted into substantially a single mass by the rolling action within the bight; and continuously discharging said mass from said bight.

2. An improved system for the low temperature rendering of fat from packinghouse scraps, said system comprising: a comminutor for reducing the fatty scraps to small particles; a melting vessel in communication with said comminutor for converting the fatty scrap material into a pumpable condition; a pump connected to said melting vessel for removing the melter fatty scrap material therefrom; a filter cloth draped to present a bight for receiving the melted fatty scrap material from said pump; a frame supporting said cloth; power means connected to rockingly oscillate said frame through an angle to move the cloth in said bight in alternately opposite directions; liquid receiving means beneath said filter cloth for receiving the fat filtrate therefrom; and a solids collector means positioned adjacent said frame at a level below said cloth for receiving separated protein solids from the bight of said filter cloth.

3. The apparatus of claim 2 wherein the cloth is draped from two ends thereof attached to said frame to form a cloth bight having a higher end, for receiving the melted fatty scrap material, and a lower end for discharging separated solids into said collector means, and said frame supports said two cloth ends oppositely spaced about a shaft upon which said frame is rocked whereby said cloth ends are alternately raised and lowered a substantial distance to move said cloth in alternating directions through said bight.

References Cited
UNITED STATES PATENTS

| | | | |
|---|---|---|---|
| 2,193,871 | 5/1940 | Hanno | 260—412.6 |
| 2,388,284 | 11/1945 | Ratner | 260—412.6 |
| 2,467,529 | 4/1949 | Hormel | 260—412.6 |
| 2,551,042 | 5/1951 | Nyrop | 23—280 |
| 2,673,790 | 3/1954 | Illsley | 23—280 |
| 2,697,112 | 12/1954 | Dramer | 260—412.6 |
| 2,742,488 | 4/1956 | Dufault | 260—412.6 |
| 2,820,804 | 1/1958 | Gordon | 260—412.6 |
| 2,911,421 | 11/1959 | Greenfield | 260—412.6 |
| 2,984,622 | 5/1961 | Bruninghaus | 210—19 |
| 3,020,160 | 2/1962 | Downing et al. | 99—107 X |
| 3,044,623 | 7/1962 | Behrens | 209—275 |
| 3,058,830 | 10/1962 | Christianson | 99—108 |

FOREIGN PATENTS 86,352  10/1957  Netherlands.

HYMAN LORD, *Primary Examiner.*

ABRAHAM W. WINKELSTEIN, DANIEL D. HORWITZ, A. LOUIS MONACELL, *Examiners.*

A. E. TANENHOLTZ, *Assistant Examiner.*